O. W. LINSTRUM.
AUTOMOBILE TIRE PUMP.
APPLICATION FILED MAR. 12, 1910.

1,011,353.

Patented Dec. 12, 1911.

2 SHEETS—SHEET 1.

Witnesses
W. E. Smith
B. G. Richards

Inventor
Otto W. Linstrum,
by Joshua R. H. Potts
his Attorney.

O. W. LINSTRUM.
AUTOMOBILE TIRE PUMP.
APPLICATION FILED MAR. 12, 1910.
1,011,353.
Patented Dec. 12, 1911.
2 SHEETS—SHEET 2.
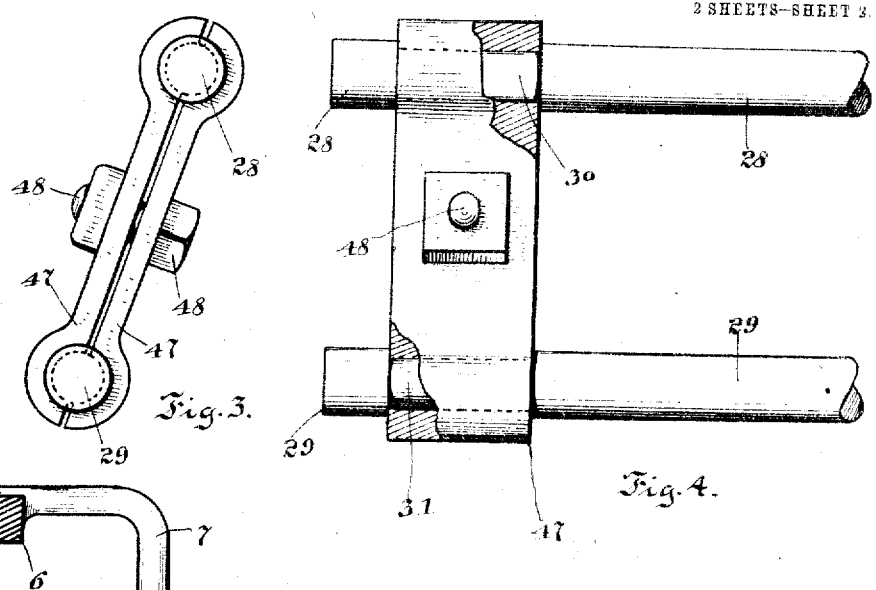
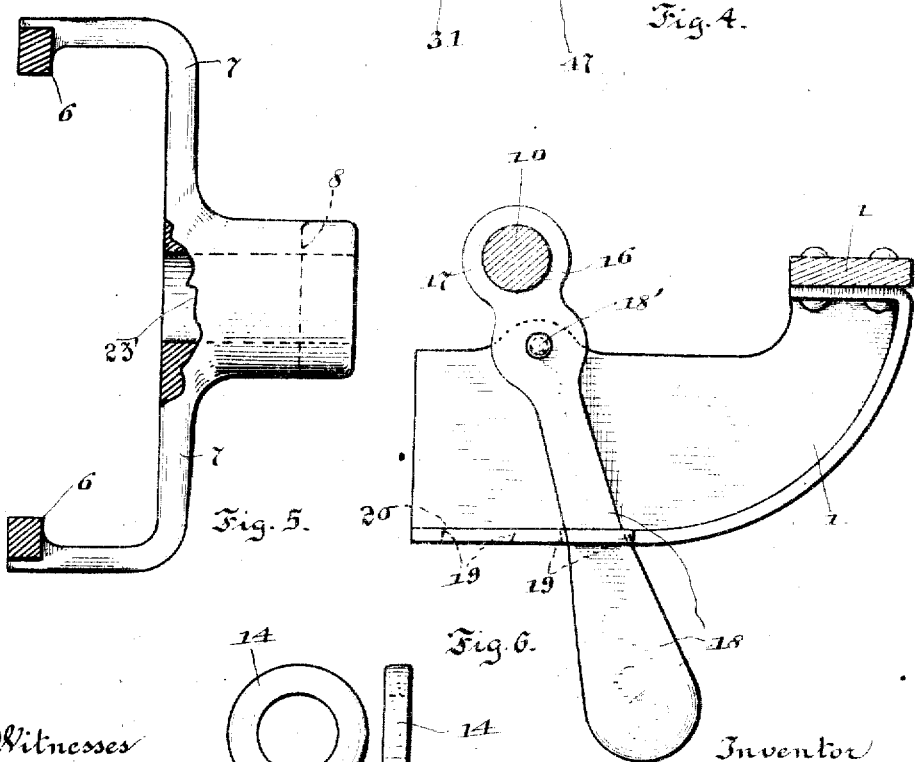
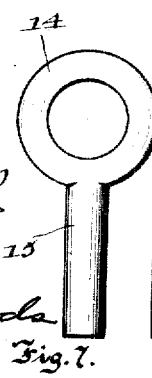
Witnesses
W. C. Smith
B. G. Richards
Inventor
Otto W. Linstrum
by Joshua R. H. Potts
his Attorney.

UNITED STATES PATENT OFFICE.

OTTO W. LINSTRUM, OF HOOPESTON, ILLINOIS.

AUTOMOBILE TIRE-PUMP.

1,011,353.

Specification of Letters Patent.  Patented Dec. 12, 1911.

Application filed March 12, 1910.  Serial No. 548,999.

*To all whom it may concern:*

Be it known that I, OTTO W. LINSTRUM, a citizen of the United States, residing at Hoopeston, county of Vermilion, and State of Illinois, have invented certain new and useful Improvements in Automobile Tire-Pumps, of which the following is a specification.

My invention relates to improvements in automobile tire pumps and has for its object the production of a device of this character which derives its power from the automobile engine. A further object of my invention is to provide means whereby the pump may be connected or disconnected from the engine at the will of the operator.

A further object of my invention is the production of a power tire pump which shall possess a minimum number of parts, be inexpensive of manufacture, and be efficient in operation. Other objects will appear hereinafter.

With these objects in view my invention consists in the novel construction and arrangement of parts, which will be hereinafter fully described and particularly pointed out in the appended claims.

Figure 1:
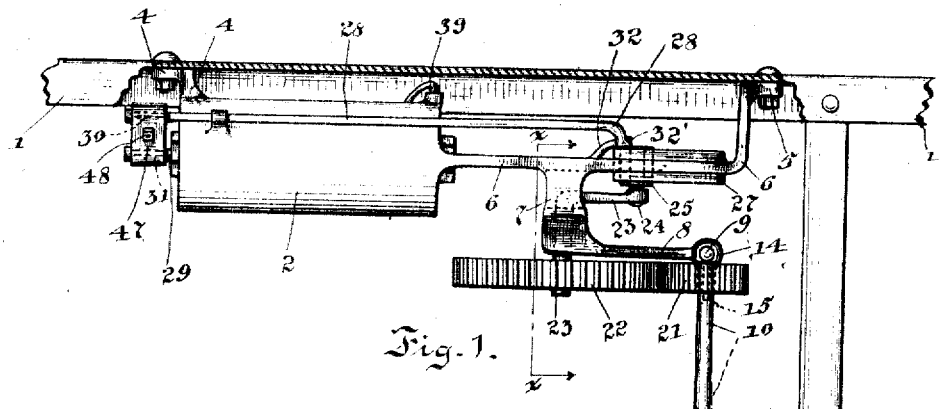
Figure 2:
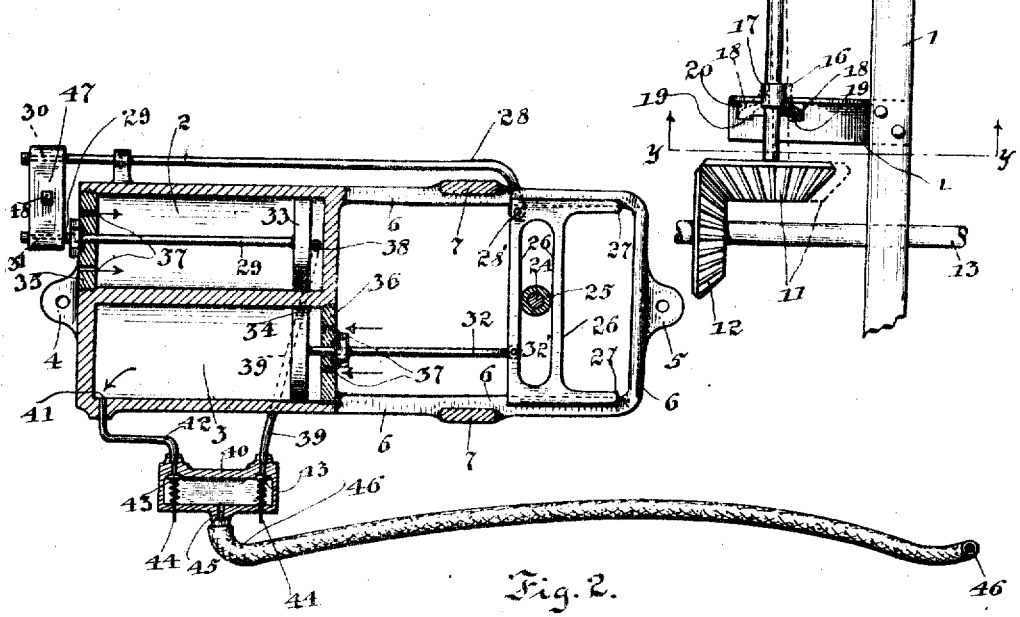

My invention will be more readily understood by reference to the accompanying drawings forming a part of this specification, and in which, Figure 1 is a top plan view of an automobile frame and a pump attached thereto constructed according to my invention, Fig. 2 is a central longitudinal section showing the pump and the main operative parts thereof, Figs. 3 and 4 are detail end and side elevations respectively, Fig. 5 is a vertical section taken on line *x—x* of Fig. 1, Fig. 6 is a vertical section taken on line *y—y* of Fig. 1, and Figs. 7 and 8 are detail views showing a part used in a swivel joint connection employed in the device.

Referring now to the drawings 1 designates a portion of a standard pressed steel automobile frame to which the pump is attached. The horizontal cylinders 2 and 3 of the pump are superimposed as shown in Fig. 2 and are cast integral, the lug 4 extending laterally from the rear end of the casting being bolted to the frame. Extending forwardly from the cylinders are guide members 6 terminating in a lug 5 which is bolted to the frame the same as the lug 4. Extending inwardly from the members 6 are arms 7 which terminate in a crank shaft hanger as shown in detail Fig. 5, the arm 8 extending forwardly from said hanger terminating in a swivel joint 9 by means of which the shaft 10 is connected. The latter shaft extends inwardly and at its inner extremity a driven bevel gear 11 is provided which meshes with the driving bevel gear 12. The bevel gear 12 is mounted on the engine shaft 13 which extends forwardly to the engine (not shown). The swivel joint 9 comprises a member 14 having an eye and stem 15, the former being pivoted to the arm 8 and the latter forming a journal on which the shaft 10 revolves. The end of the shaft 10 opposite the swivel joint connection is journaled in the eye 16 which is provided at the upper end of the gear shift lever 17, the latter being pivoted to an arm of the frame 1 as shown in detail in Fig. 6. The portion of the gear shift lever below the pivot 18' serves as a handle, access thereto being from under the automobile. When the bevel gears 11 and 12 are in mesh the position of the shift lever is as shown in Figs. 1 and 6, and when said gears are thrown out of mesh the shift lever assumes the dotted line position, as shown in Fig. 1. In order to hold the gear shift lever in either the operative or inoperative position the handle thereof is made flexible so as to be adapted to spring into the recesses 19 formed in one edge of the slot 20 which is formed in the frame 1 as shown in Figs. 1 and 6.

The driving spur gear 21 mounted on the outer end of the shaft 10 is in constant mesh with the relatively larger driven spur gear 22 which is mounted on the crank shaft 23. The latter shaft is journaled in the bearing of the crank shaft hanger, a crank pin 24 being provided on said crank shaft. Mounted on the crank pin 24 is a friction roller 25 which operates in the scotch yoke 26, the object being to convert rotary into reciprocatory motion. The upper and lower portions 27 of the scotch yoke 26 are grooved and adapted to slide on the guide members 6, as clearly shown in Fig. 2.

The connecting rod 28 is secured to the scotch yoke 26 at the point 28', and the piston rod 29 is connected with said connecting rod by means of split transverse members 47 held together by bolts 48', reduced portions 30 and 31 being provided in the rods 28 and 29 respectively. The piston rod 32 is connected to the scotch yoke at the point 32', and the piston rods 29 and 32 terminate in pistons 33 and 34 respectively. Removable heads 35 and 36 having air inlet perforations 37 are provided in the cylinders 2 and 3 respectively, the direction of the incoming air being indicated by arrows. A port 38 provided in the cylinder 2 communicates with the air conduit 39 which leads to the valve chamber 40, and a similar port 41 is provided in the cylinder 3 which communicates with the air conduit 42 leading also to the valve chamber 40. The automatic spring pressed check valves 43 having stems 44 and provided in the valve chamber 40 are of ordinary design and serve the usual purpose of preventing the return flow of air after it has been forced into the valve chamber. The discharge nozzle 45 in the valve chamber is provided, as shown, and connected thereto is a hose pipe 46.

The operation of the pump is as follows: When the shift lever 17 and the gear 11 are in the full line or operative positions the pump will be driven by the engine. The pistons will reciprocate synchronously, but, since the port in one cylinder is opposite to that in the other, nearly a constant pressure will be maintained in the valve chamber and hose pipe.

While I have shown what I deem to be the preferable form of my improved automobile tire pump, I do not wish to be limited thereto, as there might be various changes made in the details of construction and arrangement of parts described without departing from the spirit of my invention, and hence I desire to avail myself of such changes and alterations as fairly fall within the scope of the appended claims.

Having described my invention what I claim as new and desire to secure by Letters Patent is:

1. The combination with an automobile of a pair of superimposed oppositely disposed pump cylinders formed in one casting having an integral centrally arranged guide projecting from one end thereof; a piston in said cylinders; a scotch yoke mounted to reciprocate in said guide; operative connections between said yoke and said pistons; and an operative connection between said yoke and the engine shaft of said automobile, substantially as described.

2. The combination with an automobile of a pair of superimposed oppositely disposed pump cylinders formed in one casting having an integral centrally arranged guide projecting from one end thereof, there being a securing lug provided at the end of said guide and at the opposite end of said casting, said casting being secured to the frame of the automobile by bolts passing through said lugs; pistons in said cylinders; a scotch yoke mounted to reciprocate in said guide; operative connections between said yoke and said piston; and an operative connection between said yoke and the engine shaft of said automobile, substantially as described.

In testimony whereof I have signed my name to this specification in the presence of two subscribing witnesses.

OTTO W. LINSTRUM.

Witnesses:
C. O. LARSON,
ROBERT R. RODMAN.